United States Patent
Khojastepour et al.

(10) Patent No.: US 9,722,720 B2
(45) Date of Patent: Aug. 1, 2017

(54) SCALING WIRELESS FULL DUPLEX IN MULTI-CELL NETWORKS WITH SPATIAL INTERFERENCE ALIGNMENT

(71) Applicant: NEC Laboratories America, Inc., Princeton, NJ (US)

(72) Inventors: Mohammad Khojastepour, Lawrenceville, NJ (US); Karthikeyan Sundaresan, Howell, NJ (US); Sampath Rangarajan, Bridgewater, NJ (US)

(73) Assignee: NEC Corporation, Tokyo (JP)

(*) Notice: Subject to any disclaimer, the term of this patent is extended or adjusted under 35 U.S.C. 154(b) by 49 days.

(21) Appl. No.: 14/811,268

(22) Filed: Jul. 28, 2015

(65) Prior Publication Data
US 2016/0036504 A1 Feb. 4, 2016

Related U.S. Application Data

(60) Provisional application No. 62/030,271, filed on Jul. 29, 2014.

(51) Int. Cl.
*H04B 7/04* (2017.01)
*H04J 11/00* (2006.01)
*H04B 7/024* (2017.01)

(52) U.S. Cl.
CPC ............ *H04J 11/005* (2013.01); *H04B 7/024* (2013.01)

(58) Field of Classification Search
CPC ........... H04L 25/0398; H04L 25/03968; H04L 25/0391; H04L 25/0224; H04L 5/0023; H04J 11/003; H04B 7/024; H04B 7/0617; H04B 7/0619; H04B 7/0486; H04B 7/0413; H04W 16/14; H04W 16/02; H04W 24/02; H04W 4/06; H04W 36/20
See application file for complete search history.

(56) References Cited

U.S. PATENT DOCUMENTS

| | | | | |
|---|---|---|---|---|
| 9,214,995 B2* | 12/2015 | Bayesteh | ............ | H04B 7/0413 |
| 2013/0267240 A1* | 10/2013 | Fu | .......... | H04L 1/0026 |
| | | | | 455/452.2 |
| 2013/0322301 A1* | 12/2013 | Ghauri | .......... | H04W 16/14 |
| | | | | 370/280 |

(Continued)

OTHER PUBLICATIONS

Bai, J., et al., "Distributed Full-duplex via Wireless Side-Channels: Bounds and Protocols," IEEE Transactions on Wireless Communications, vol. 12, No. 8, Aug. 2013. (pp. 1-12).

*Primary Examiner* — Jung-Jen Liu
(74) *Attorney, Agent, or Firm* — Joseph Kolodka

(57) ABSTRACT

A method, system, and computer program product for minimizing intra-cell and inter-cell interference in a multi-cell full duplex communication system in a wireless network. The method includes selecting, by a client selector, a plurality of clients, wherein the plurality of clients includes a plurality of uplink clients configured to transmit signals and a plurality of downlink clients configured to receive signals over a plurality of data streams in each cell of the multi-cell full duplex communication system, and performing, by a spatial interference aligner, spatial interference alignment on interfering data streams to align the interfering data streams of uplink clients towards downlink clients in its own cell and downlink clients in a neighboring cell.

20 Claims, 12 Drawing Sheets

(56) References Cited

U.S. PATENT DOCUMENTS

| | | | | |
|---|---|---|---|---|
| 2013/0329822 A1* | 12/2013 | Kang | .................... | H04B 7/0817 |
| | | | | 375/267 |
| 2014/0003274 A1* | 1/2014 | Clerckx | .............. | H04L 25/0204 |
| | | | | 370/252 |
| 2014/0112234 A1* | 4/2014 | Wei | ........................ | H04J 11/003 |
| | | | | 370/312 |
| 2014/0112272 A1* | 4/2014 | Ro | ........................ | H04W 24/02 |
| | | | | 370/329 |
| 2014/0219373 A1* | 8/2014 | Mobasher | ............ | H01Q 3/2605 |
| | | | | 375/267 |
| 2014/0334396 A1* | 11/2014 | Lee | ........................ | H04L 5/0062 |
| | | | | 370/329 |
| 2014/0348253 A1* | 11/2014 | Mobasher | ............ | H04B 7/0452 |
| | | | | 375/267 |
| 2015/0131751 A1* | 5/2015 | Bayesteh | .............. | H04B 7/0413 |
| | | | | 375/267 |

* cited by examiner

SCALING WIRELESS FULL DUPLEX IN MULTI-CELL NETWORKS WITH SPATIAL INTERFERENCE ALIGNMENT

RELATED APPLICATION INFORMATION

This application claims priority to provisional application Ser. No. 62/030,271 filed on Jul. 29, 2014, incorporated herein by reference.

BACKGROUND

Technical Field

The present invention generally relates to strategies for scaling full duplex wireless communication systems. More particularly, the present disclosure is related to using spatial interference alignment for scaling full-duplex wireless systems in multi-cell full duplex networks.

Description of the Related Art

In full duplex (FD) communication systems, there have been various system works on FD that have focused on addressing self-interference. The capacity of simple carrier-sensing wireless networks with full duplex capability at both access points (APs) and clients has been studied. However, the results of these studies are not applicable to self-interference cancellation in full duplex communication systems with uplink downlink interference (UDI), as carrier-sensing precludes the notion of cooperative multiple input multiple output (MIMO) systems and hence side-steps the UDI problem. The use of interference alignment (IA) in a time domain (e.g., through symbol extension) for addressing UDI in full duplex networks requires an interference channel to repeat itself and, therefore, is not conducive for a practical realization of full duplex capability.

SUMMARY

In one embodiment of the present principles, a method for minimizing intra-cell and inter-cell interference in a multi-cell full duplex communication system in a wireless network is provided. In an embodiment, the method may include selecting, by a client selector, a plurality of clients, wherein the plurality of clients includes a plurality of uplink clients configured to transmit signals and a plurality of downlink clients configured to receive signals over a plurality of data streams in each cell of the multi-cell full duplex communication system, and performing, by a spatial interference aligner, spatial interference alignment on interfering data streams to align the interfering data streams of uplink clients towards downlink clients in its own cell and downlink clients in a neighboring cell.

In another embodiment, an interference alignment system for minimizing intra-cell and inter-cell interference in a multi-cell full duplex communication system in a wireless network is provided. In an embodiment, the interference alignment system may include a client selector configured to select a plurality of clients, wherein the plurality of clients includes a plurality of uplink clients configured to transmit signals and a plurality of downlink clients configured to receive signals over a plurality of data streams in each cell of the multi-cell full duplex communication system, and a spatial interference aligner configured to perform spatial interference alignment on interfering data streams, using a hardware processor, to align the interfering data streams of uplink clients towards downlink clients in its own cell and downlink clients in a neighboring cell.

In yet another aspect of the present disclosure, a computer program product is provided that includes a computer readable storage medium having computer readable program code embodied therein for performing a method for minimizing intra-cell and inter-cell interference in a multi-cell full duplex communication system in a wireless network. In an embodiment, the method may include selecting, by a client selector, a plurality clients in each cell of the multi-cell full duplex communication system, wherein the plurality of clients includes a plurality of uplink clients configured to transmit signals and a plurality of downlink clients configured to receive signals over a plurality of data streams, and performing, by a spatial inference aligner, spatial interference alignment on interfering data streams to align the interfering data streams of uplink clients towards downlink clients in its own cell and downlink clients in a neighboring cell.

These and other features and advantages will become apparent from the following detailed description of illustrative embodiments thereof, which is to be read in connection with the accompanying drawings.

BRIEF DESCRIPTION OF DRAWINGS

The present principles will provide details in the following description of preferred embodiments with reference to the following figures wherein.

DETAILED DESCRIPTION OF PREFERRED EMBODIMENTS

Figure 1:
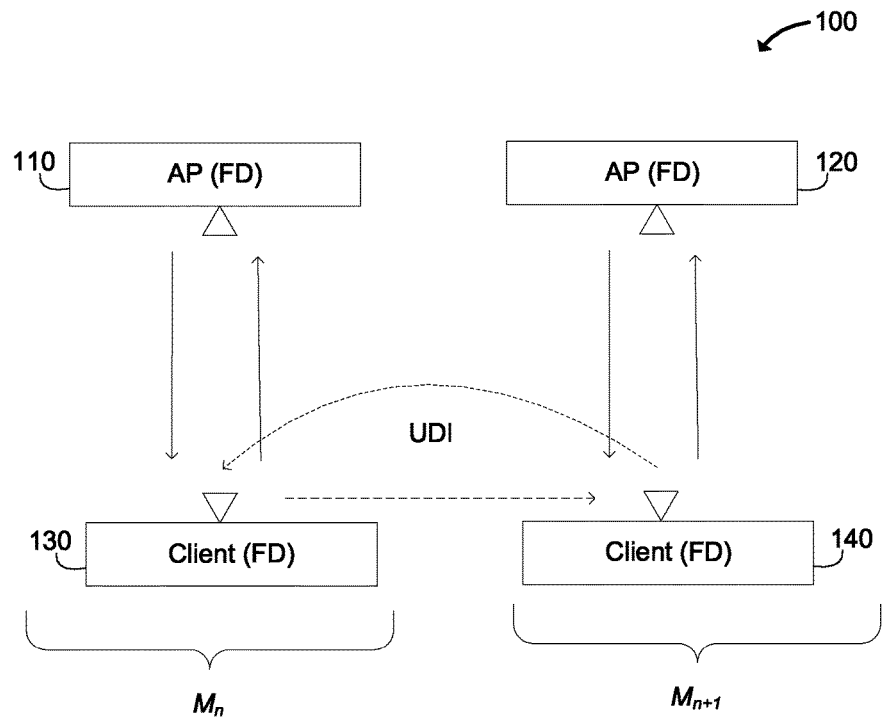
FIG. 1 is a schematic of uplink downlink interference (UDI) with full duplex clients in a multi-cell full duplex (FD) wireless network, to which the present principles can be applied in an embodiment.

The present principles are directed to scaling wireless full duplex in multi-cell networks with spatial interference alignment. One of the main challenges in deployment of full duplex (FD) systems in a network is scaling of the wireless full duplex operation when multi-cell networks are considered. In one aspect, the methods, systems and computer program products disclosed herein advantageously provide a practical way of solving this challenge in a wireless system consisting of a single cell or multiple cells with full duplex access points. In one embodiment, spatial interface alignment may characterize the scalability of FD's multiplexing gain in multi-cell full duplex communication networks over half duplex (HD) networks that are capable of transmitter cooperation (e.g., network MIMO).

Enabling self-interference cancellation is fundamental to realize a full duplex (FD) capability. However, system wide deployment of full duplex communication networks is fundamentally challenged by a new form of interference, namely uplink downlink interference (UDI), which is caused by transmission of uplink clients in the downlink reception of other clients working in the same frequency band. In this context, the methods, systems and computer program products disclosed herein may utilize spatial interference alignment (IA) as an effective and scalable technique to address the uplink downlink interference (UDI), and hence enable full duplex (FD) in these networks. The present disclosure also provides a solution and system that incorporates this notion. In some embodiments, the methods, systems and computer program products that are disclosed herein characterize the scalability of the full duplex multiplexing gain in terms of M cell networks and provide a spatial interference alignment (IA) construction that achieves the best scaling of full duplex (FD) multiplexing gain in terms of M cell networks.

It should be understood that embodiments described herein may be entirely hardware or may include both hardware and software elements, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor, e.g., a hardware processor, coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

A "duplex communication system" is a point-to-point system composed of two connected parties or devices that can communicate with one another in both directions. Generally, there are two types of duplex communication systems: full duplex (FD) communication systems and half duplex (HD) communication systems. In a full duplex communication system, both parties (e.g. client devices) may communicate to the other simultaneously. In a half duplex communication system, in contrast, each party (e.g., client device) may communicate to the other, but not simultaneously. Thus, in a half duplex communication system, the communication between client devices is one direction at a time.

Wireless full duplex (FD) networks allow a node (e.g., client device) to transmit and receive simultaneously in the same frequency band, thereby doubling the link capacity. Key challenges to realizing a full duplex (FD) node is to address the self-interference between the simultaneous transmit and receive data paths (e.g., data streams) generated during the full duplex (FD) communication at the node. While it may be possible to embed the processing required for self-interference (SI) cancellation at an access point (AP) or base station (BS), this may not be possible with client devices that are energy-constrained to begin with. Hence, in some embodiments, to allow for widespread adoption of full duplex (FD) communication networks, it is important to realize full duplex (FD) communication networks with half duplex (HD) clients, a process referred to as distributed full duplex.

Referring to the drawings in which like numerals represent the same or similar elements and initially to FIG. 1, uplink downlink interference (UDI) in full duplex (FD) communication systems 100 is illustratively depicted, to which the present principles can be applied in an embodiment. For example, the uplink downlink interference (UDI) involves a first full duplex access point (AP) 110, a second full duplex access point (AP) 120, a first full duplex (FD) client 130, and a second full duplex (FD) client 140. In this example, the first full duplex access point (AP) 110 and the first full duplex (FD) client 130 form a first M cell, namely $M_n$ where n represents the number of M cells. Similarly, the second full duplex access point (AP) 120 and the second full duplex (FD) client 140 form a second M cell, namely $M_{n+1}$, which may be referred to as a neighboring cell. Accordingly, the plurality of M cells forms a multi-cell network.

In multi-cell networks, the uplink (UL) transmissions from the first full duplex (FD) client 130 in one cell may interfere with the downlink (DL) transmissions of other full duplex (FD) clients, including the second full duplex (FD) client 140, in neighboring cells in a multi-cell full duplex communication system 100, potentially nullifying the benefits from full duplex in each cell, as illustrated in FIG. 1.

This interference between clients of different and/or neighboring cells is referred to as "inter-cell interference."

Figure 2:
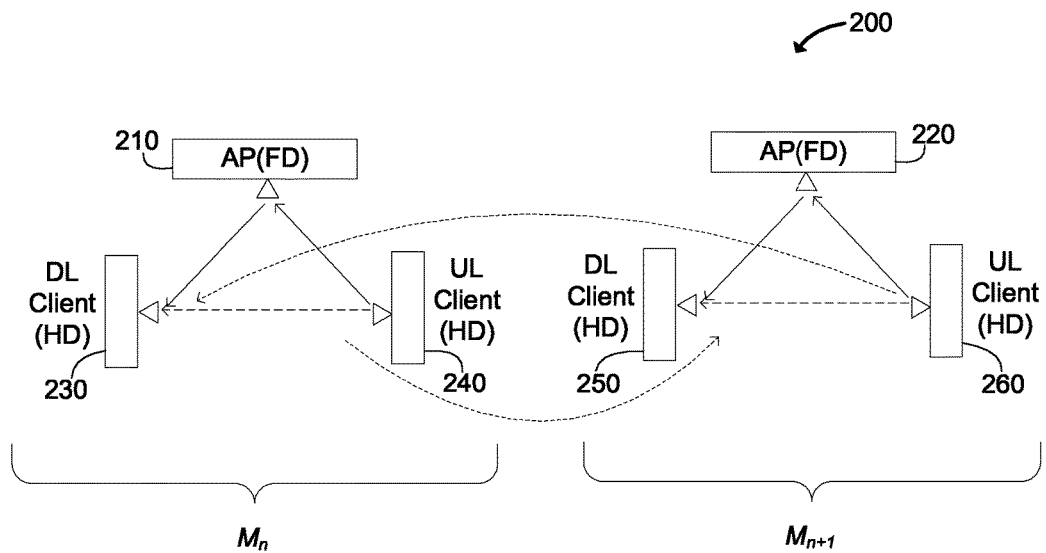
FIG. 2 is a schematic of uplink downlink interference (UDI) with half duplex clients in a multi-cell full duplex (FD) wireless network, to which the present principles can be applied in an embodiment.

Further, such uplink downlink interference (UDI) may arise even within a single M cell (referred to as "intra-cell interference"), for example when the client devices are half duplex (HD). Referring now to FIG. 2, uplink downlink interference (UDI) with half duplex (HD) clients in full duplex (FD) communication systems 200 is illustratively depicted, to which the present principles can be applied in an embodiment. For example, the uplink downlink interference (UDI) involves a first full duplex access point (AP) 210, a second full duplex access point (AP) 220, a first half duplex (HD) client including a first downlink (DL) client 230 and a first uplink (UL) client 240, and a second half duplex (HD) client including a second downlink (DL) client 250 and a second uplink (UL) client 260.

Often, it may not be possible to burden the energy-constrained client devices with full-duplex (FD) processing (e.g., self-interference cancellation) unlike the base station (BS) or access point (AP). In such cases, at least two half duplex (HD) clients, namely an uplink (UL) client 230 and downlink (DL) client 240, along with a full duplex access point 210 (e.g., AP (FD)), are needed to enable a full duplex (FD) communication session. However, enabling at least two half duplex (HD) clients in a full duplex (FD) communication session results in the uplink (UL) client 240 causing uplink downlink interference (UDI) to the downlink (DL) client 230 within the same cell (e.g., $M_n$, inter-cell interference) as well as downlink (DL) clients in neighboring cells (e.g., $M_{n+1}$, intra-cell interference) (e.g., downlink (DL) client 250) that are participating in a full duplex session 200 simultaneously, as shown in FIG. 2. It is noted that recent works address self-interference (SI), as the SI information is locally available at the full duplex (FD) node (e.g., access point (AP) or client device). However, uplink downlink interference (UDI) is much more challenging, as it is between distributed clients who cannot share data information without sacrificing bandwidth resources.

In half duplex (HD) networks, the performance limiting factor is inter-cell interference. Cooperative schemes, such as network multiple input multiple output (MIMO), may alleviate inter-access point (AP) interference in a single direction (e.g., downlink or uplink separately), thereby allowing the network capacity (e.g., in terms of degrees of freedom) to scale linearly with the number of cooperating APs (M) and their antenna capabilities (N) as MN. In a MIMO scheme, the capacity of a channel or link may be multiplied using multiple transmit and receive antennas to exploit multipath propagation to send and receive more than one data signal on the same channel at the same time.

However, when full duplex (FD) is enabled at the access points (APs), access point-cooperation cannot help bi-directional UDI. The bi-directional UDI's impact is amplified in multi-cell networks, with each downlink (DL) client not only receiving UDI from uplink (UL) clients within its own cell (e.g., intra-cell inference when clients are half duplex), but also from uplink (UL) clients of neighboring cells (e.g., inter-cell inference) that are participating in a full duplex session simultaneously, as shown in FIG. 1. Thus, while adding more cells M to a cooperative network allows the HD capacity to scale with M, it only exacerbates UDI when FD is enabled.

Figure 3:
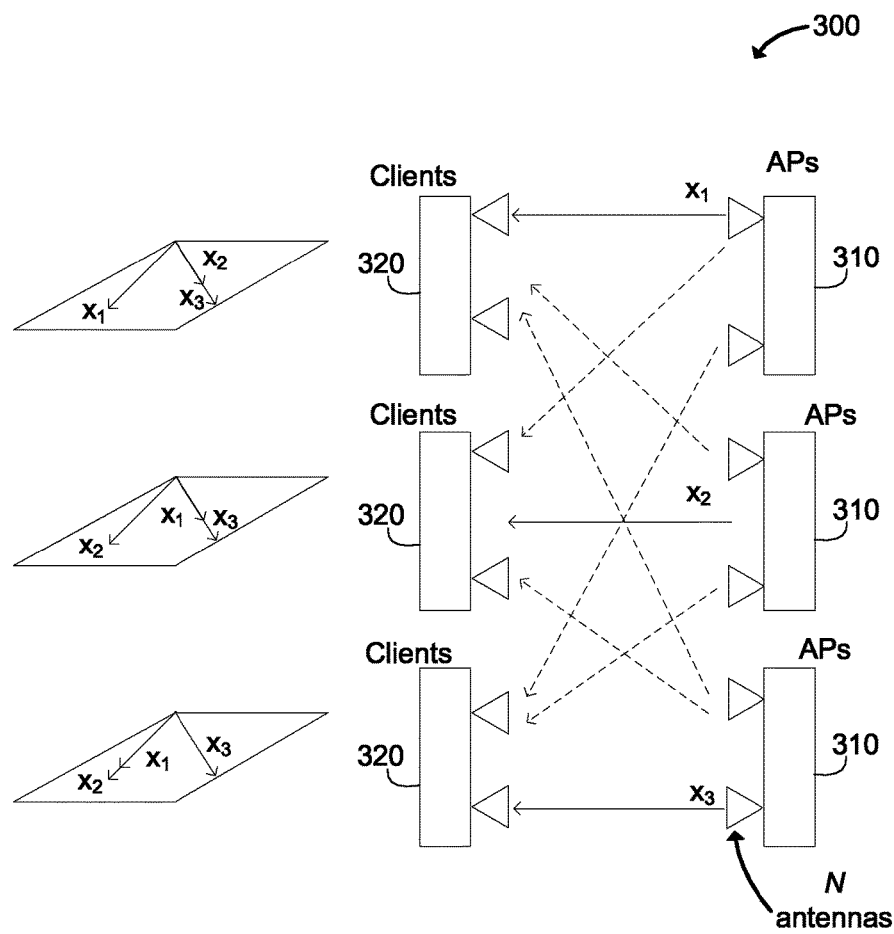
FIG. 3 is a schematic of spatial interface alignment (IA) to address uplink downlink interference (UDI) in a half duplex (HD) wireless network, to which the present principles can be applied in an embodiment.

Referring now to FIG. 3, a conventional interference alignment scheme to address uplink downlink interference (UDI) in a half duplex (HD) wireless network 300 to minimize intra-cell and inter-cell interference is shown, to which the present principles can be applied in an embodiment. In FIG. 3, M is a cell network including a set or plurality of access points 310 and a corresponding set or plurality of client devices 320. In addition, each of the access points 310 (e.g., APs, transmitters (TXs)) and client devices 320 (e.g., clients, receivers (RXs)) may be equipped with N antennas. In some embodiments, in the baseline half duplex (HD) model, all the M cells may cooperate through network MIMO to completely translate their inter-cell interference into a multiplexing gain of MN in both the downlink and uplink. It should be noted that the amount of information sharing (e.g., to enable network MIMO) on the backhaul may vary significantly between uplink (UL) and downlink (DL).

In FIG. 3, for example, three access points 310 (APs) with two N antennas each, desire to send a single data stream $x_1$, $x_2$, $x_3$ to their respective clients 320, wherein each client has two N antennas. Being limited to two antennas (e.g., two spatial dimensions or degrees of freedom) at the client devices 320 and assuming lack of transmitter cooperation, only two of the data streams may be delivered in this network without spatial interference alignment (IA). However, spatial IA may allow delivery of all three streams $x_1$, $x_2$, $x_3$. In some embodiments, two interfering streams at each of the client devices may be aligned to consume a single spatial dimension (e.g., degree of freedom (DoF)), thereby allowing the other dimension for its desired stream.

For example, the alignment of the two interfering streams may be accomplished by precoding, whereby the data stream at the transmitter (e.g., AP) is multiplied by a precoding vector (V) to provide a precoded signal before being transmitted through the N antennas onto the channel such that:

$$H_{ji}V_i \overset{s}{=} H_{jk}V_k, \ \forall j, \ s.t. \ j \neq i \neq k \qquad (1)$$

where $H_{ji}$ is the channel matrix between transmitter i and receiver j, k is a total number of transmitters and/or receivers, and $\overset{s}{=}$ indicates that the span of the vector spaces defined by matrices on either sides of the operator are the same. Appropriate precoders at the different transmitters (TXs) may be chosen based on the above constraints to realize the desired alignment, while the receive filters at the receivers (RXs) may be chosen orthogonal to the space of the interference to receive the desired streams.

Figure 4:
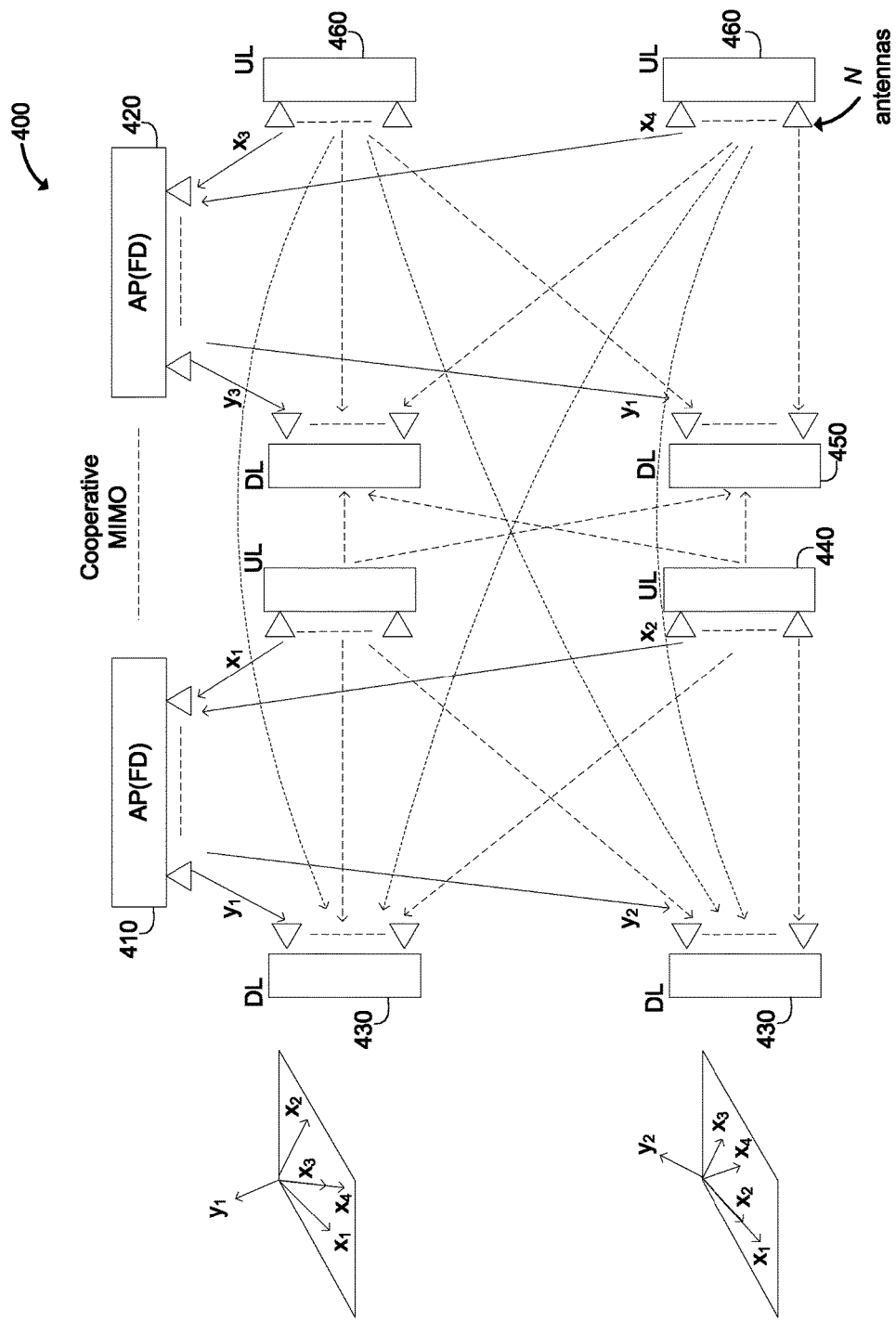
FIG. 4 is a schematic of spatial interface alignment (IA) to address uplink downlink interference (UDI) with half duplex (HD) clients in a multi-cell full duplex (FD) wireless network, in accordance with an embodiment of the present principles.

Referring now to FIG. 4, the method, system, and computer program product disclosed herein may leverage spatial interference alignment (IA) towards addressing the uplink downlink interference (UDI) problem in multi-cell full duplex (FD) networks. In FIG. 4, an example of spatial interference alignment (IA) to address uplink downlink interference (UDI) with half duplex (HD) clients in a multi-cell full duplex (FD) wireless network 400 to minimize intra-cell and inter-cell interference is illustratively depicted. For example, the uplink downlink interference (UDI) involves a first full duplex access point (AP) 410, a second full duplex access point (AP) 420, a plurality of first half duplex (HD) client devices including a plurality of first downlink (DL) clients 430 and a plurality of first uplink (UL) clients 440, and a plurality of second half duplex (HD) client devices including a plurality of second downlink (DL) clients 450 and a plurality of second uplink (UL) clients 460. In one embodiment, for example, with multiple N antennas being available at uplink and downlink clients, the plurality of half duplex (HD) uplink (UL) clients 440, 460 may use their spatial dimensions (e.g., degree of freedom) effectively to align their interfering data streams (e.g., transmissions to full-duplex (FD) access points (AP) 410, 420) towards the plurality of half duplex (HD) downlink (DL) clients 430, 450 of full duplex (FD) sessions both in its own cell and neighboring cells, as shown in FIG. 4.

In further embodiments, spatial interference alignment (IA) may be applied to multi-cell full duplex communication networks to provide a scalable multiplexing gain from FD in multi-cell networks. As will be discussed below, the present disclosure provides an spatial interference alignment (IA) solution that may leverage the interference structure of full duplex communication networks to achieve optimal scaling of the full duplex multiplexing gain in multi-cell full duplex networks, employing O(MN) nodes (e.g., client devices). While schemes like network MIMO incur a backhaul overhead in enabling access point-cooperation, spatial interference alignment (e.g., to address UDI) may require additional channel state information (CSI) overhead between the uplink (UL) and downlink (DL) clients. In wireless communications, channel state information (CSI) refers to known channel properties of a communication link, including how a signal propagates from a transmitter to a receiver. In some embodiments, using the channel state information (CSI) between the UL and DL clients, appropriate precoders (e.g., at UL clients—transmitters TXs) and receive filters (e.g., at DL clients—receivers RXs) may enable such alignment and minimize and/or remove uplink-downlink interference (UDI).

In some embodiments, the method, system, and computer program product disclosed herein may characterize the multiplexing gain in practical settings with limited number of clients and restrictions on information sharing between the cooperating access points (APs). For example, the method, system, and computer program product disclosed herein may show that full duplex (FD) communication systems may provide a multiplexing gain of two over half duplex (HD) communication systems for large cooperative networks (e.g., large M), when network MIMO is available only on the downlink (DL), and downlink (DL) and uplink (UL) traffic are balanced. While both FD and HD may suffer in absolute performance in the absence of uplink network MIMO, the relatively smaller loss in FD enables it to achieve its full multiplexing gain even in large networks. In addition, the present principles may show that asymptotic scaling gain of $$1 + \frac{1}{M-1}$$

may be realized with $O(M^2)$ nodes and does not require O(MN) nodes, which is useful when M<<N (e.g., large antenna arrays).

Some of the contributions of the method, system and computer program product disclosed herein include: providing spatial interference alignment as an effective approach to address UDI in multi-cell distributed full duplex communication networks to minimize intra-cell and inter-cell interference, characterizing the scalability of FD multiplexing gain in multi-cell networks in closed-form, and constructing an spatial interference alignment (IA) solution to help achieve the optimal scalability in multi-cell networks and also extend the results to practical settings with limited number of clients and information sharing between the cooperating access points (APs).

In one embodiment, spatial interference alignment (IA) may allow more interfering streams to be accommodated in lesser resource dimensions, thereby leaving room to accommodate more desired streams. Resource dimensions may correspond to those in time, frequency (e.g., frequency or symbol extension) or space (e.g., antennas). In some embodiments, spatial IA may allow for a practical realization in MIMO systems, unlike former approaches that rely on certain hard-to-realize channel assumptions (e.g., non-causal CSI) as theoretical constructs.

Figure 5:
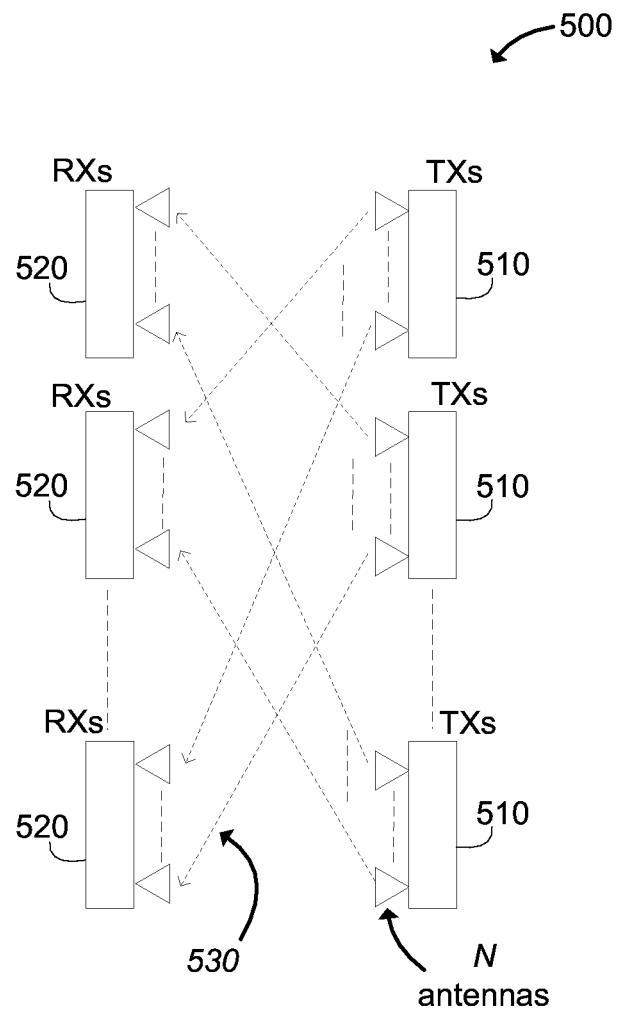
FIG. 5 is a schematic depicting a half duplex (HD) interference channel, to which the present principles can be applied in an embodiment.

Referring now to FIG. 5, an example of a half duplex (HD) interference channel 500 is shown, to which the present principles can be applied in an embodiment. One example of a conventional half duplex (HD) interference channel 500 includes links 530 between each transmitter(s) (TXs) 510 communicating with each receiver(s) (RXs) 520, each transmitter(s) (TXs) 510 and each receiver(s) (RXs) 520 including N antennas. For example, FIG. 5 shows each transmitter 510 and each receiver 520 having two antennas each, however additional antennas at each transmitter 510 and each receiver 520 is contemplated in accordance with the present principles.

Figure 6:
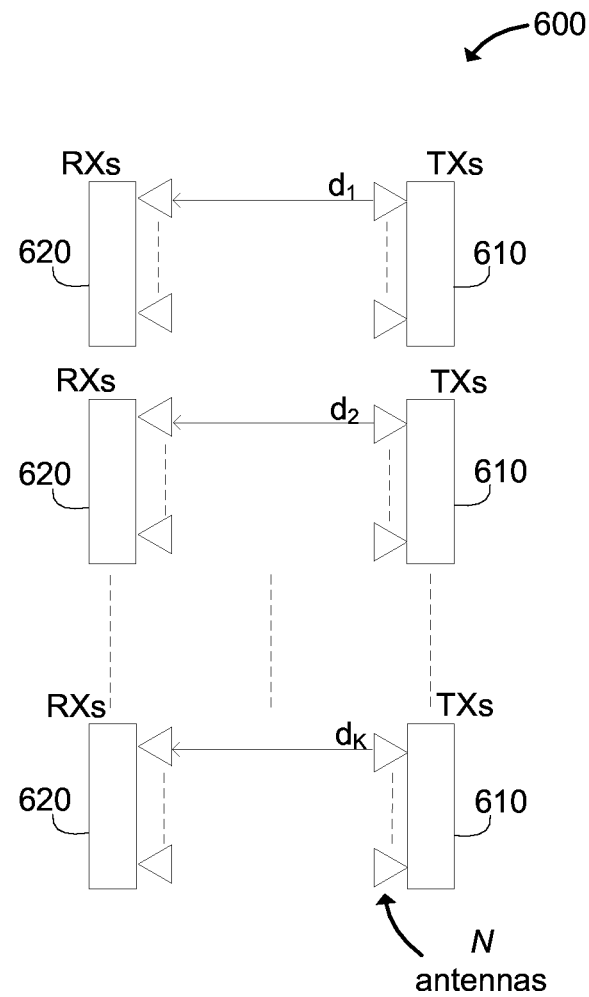
FIG. 6 is a schematic depicting a half duplex (HD) communication network, to which the present principles can be applied in an embodiment.

Referring to FIG. 6, with continued reference to FIG. 5, degrees of freedom (DoFs) $d_1, d_2, \ldots d_K$ are illustrated in a half duplex (HD) communication network 600, to which the present principles can be applied in an embodiment. In FIG. 6, the half duplex (HD) communication network 600 is illustratively depicted with a plurality of transmitters (TXs) 610 communicating with a plurality of receivers (RXs) 620, each transmitter 610 and each receiver 620 having N antennas. In spatial interference alignment (IA), the degree of freedom (DoF) on each of the half-duplex (HD) communication links (e.g., $d_i$, FIG. 6) in this interference channel essentially correspond to the rank of the precoding matrices $V_i$ and receive filters $U_j$ such that:

$$U_j H_{ji} V_i = 0, \forall i \neq j$$

$$\text{Rank}(U_i H_{ii} V_i) = d_i, \forall i = j \qquad (2)$$

Where $U_j$ represents the receive filters at a receiving point and $V_i$ represents the precoders at a transmitting point. In an embodiment, $U_j$ and $V_i$ are of size $d_j \times N$ and $N \times d_i$ respectively, while $H_{ji}$ is the channel between receiver j and transmitter i and is of size N×N. While the first constraint ensures that interfering streams are aligned in the null space of the receivers, the second constraint ensures that $d_i$ DoFs are available for the desired (communication) streams at the receiver of link i. For generic channel matrices H, it has been shown that it is sufficient to satisfy the first set of constraints (e.g., IA), which automatically leads to the second set of constraints being satisfied.

Based on the above constraints, the following conditions may be necessary for a given network to support the desired DoFs ($d_i$, $\forall i$):

$$\sum_{i:(i,j)\in S} d_i(N-d_i) + \sum_{j:(i,j)\in S} d_j(N-d_j) \geq \sum_{i,j:(i,j)\in S} d_i d_j$$

where $S \subseteq \epsilon = \{(i, j); i, j \in [1, K]\}$. The first condition indicates that the DoF on a link is limited by the minimum of the number of antennas on either ends of the communication link. The second condition indicates that to have a feasible IA solution, the system defined on any subset ($\epsilon$) of the interference constraints (e.g., S) must not be over-constrained. Note that matrices $V_i$ and $U_j$ are composed of $d_i$ and $d_j$ vectors, respectively. Hence, a single interference constraint in Equation (2) between transmitter i and receiver j is comprised of $d_i d_j$ equations, while the transmitter and receiver give rise to $d_j(N-d_j)$ variables. This condition may be referred to as the dimension counting argument.

The following description illustrates the principles of spatial interference alignment (IA) in multi-cell full duplex (FD) networks. In a half duplex (HD) interference channel 500, as shown in FIG. 5, the DoF (e.g., number of data streams) are defined on a per-link basis, with every receiver 520 (e.g., receiving desired streams) being subject to interference (e.g., interfering data streams) from the transmitters 510 of the other links. Each of the transmitters 510 can be assumed to be APs in themselves in a multi-cell network. However, in the presence of network MIMO (e.g., AP cooperation), the inter-cell interference on downlink (DL) and uplink (UL) may be eliminated in the half-duplex (HD) network. While this applies to distributed multi-cell full duplex (FD) networks as well, the uplink downlink interference (UDI) arising between clients in the same cell, as well as across neighboring cells, still remains for a two-cell network, as is shown in FIG. 7.

Figure 7:
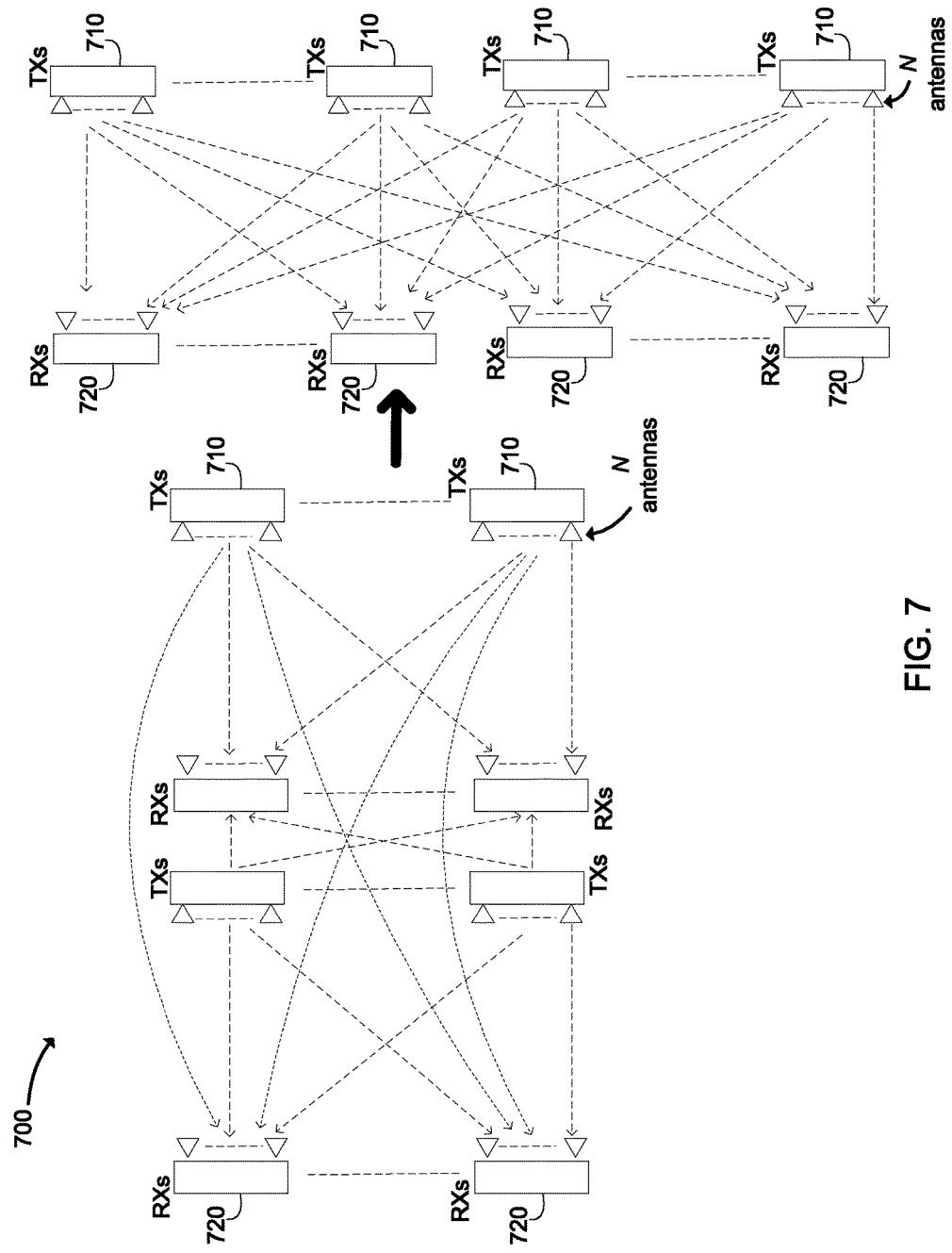
FIG. 7 is a schematic depicting a multi-cell full duplex (FD) interference channel, in accordance with an embodiment of the present principles.
Figure 8:
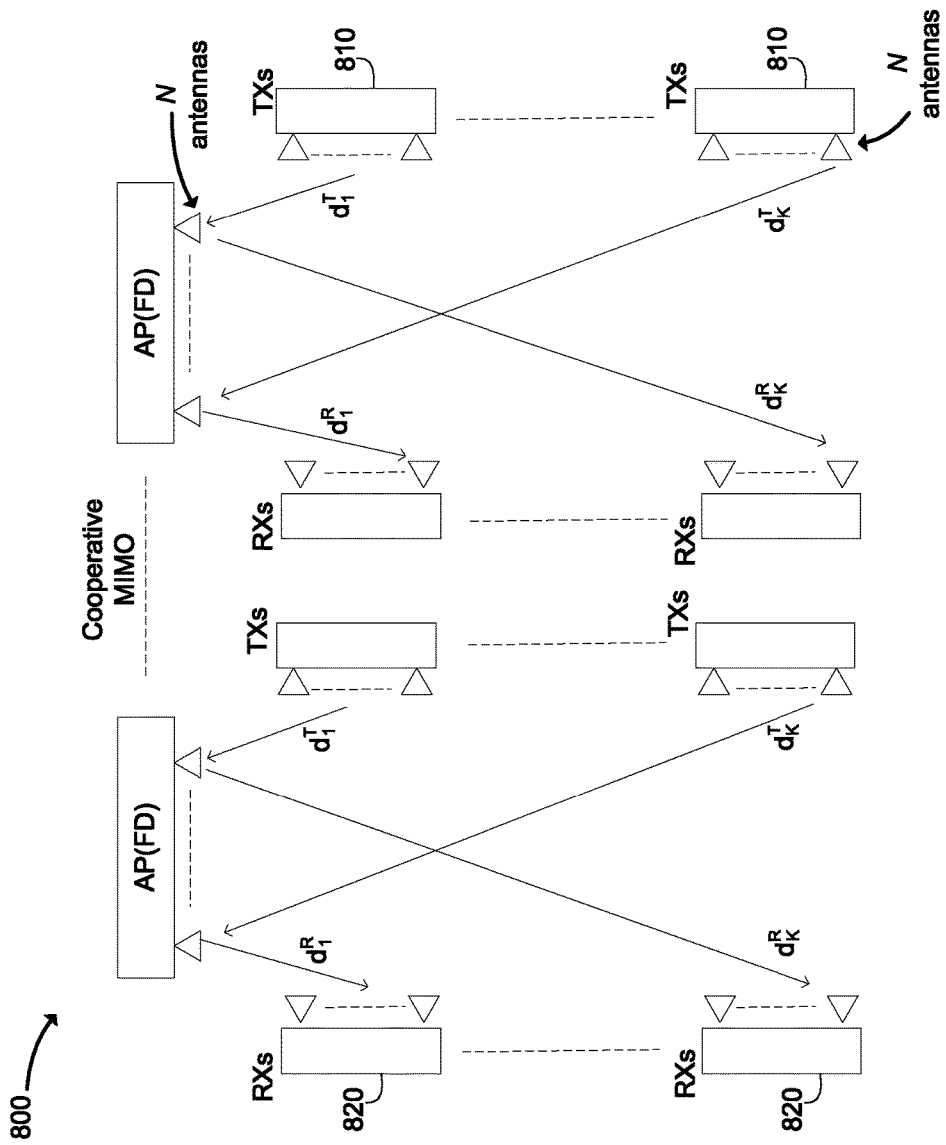
FIG. 8 is a schematic depicting a multi-cell full duplex (FD) communication network, in accordance with an embodiment of the present principles.

Referring now to FIG. 7, a two-cell full-duplex (FD) interference channel 700 in accordance with the present principles is illustratively depicted. In the two-cell full-duplex (FD) interference channel 700 (FDIC), a plurality of transmitters (TXs) 710 and a plurality of receivers (RXs) 720 are shown. Referring to FIG. 8, a full duplex (FD) communication network 800 in accordance with the present principles is illustratively depicted. In the full duplex (FD) communication network 800, a plurality of transmitters (TXs) 810 and a plurality of receivers (RXs) 820 are shown. In FIG. 8, $d_K^T$ represents the per node degree of freedom (DoF) at the transmitter 810 and $d_K^R$ represents the per node degree of freedom (DoF) at the receiver 820. In some embodiments, the method, system, and computer program product disclosed herein may provide the interference and communication network, called a full duplex interference channel (FDIC), as depicted in FIGS. 7 and 8.

It is noted that in the FDIC interference network, the full duplex (FD) access points (APs) encounter self-interference (e.g., intra-cell interference) and inter-cell interference. In some embodiments, the FDIC interference network may be represented as a fully bipartite graph between the downlink (DL) receivers (from all cells) on one side and the uplink (UL) transmitters (from all cells) on the other side, as shown in FIG. 7. A bipartite graph is a graph whose vertices can be divided into two disjoint sets (e.g., independent sets) such that every edge connects a vertex in one set to one in the other set.

In one embodiment, a full duplex interference channel (FDIC) may be decoupled from the desired/communication stream network (e.g., transmissions to APs may be removed), as shown in FIGS. 7 and 8. With no desired streams exchanged between the nodes in the interference network (e.g., clients), this allows for the degrees of freedom notion to be applied on a per-node basis, with the uplink (UL) and downlink (DL) clients potentially operating on different degrees of freedom. Thus, the spatial IA constraints for FDIC may be represented as follows:

$$U_j H_{ji} V_i = 0, \forall i,j$$

$$\text{Rank}(U_j H_{j0_j} V_{0_j}) = d_j^R, \forall j \in \{\text{all DL clients}\}$$

$$\text{Rank}(U_{0_i} H_{0_i i} V_i) = d_i^T, \forall i \in \{\text{all UL clients}\} \quad (3)$$

where index $0_j$ represents the access point (AP) to whom client j is associated with. While the first constraint ensures elimination of interference between "all" pairs of uplink (UL) and downlink (DL) clients, the last two constraints allow for varied DoF at each node, with $d_j^R$ and $d_i^T$ being the DoF for the downlink client (receiver) j and uplink client (transmitter) i, respectively, with respect to their corresponding access points (APs).

Figure 9:
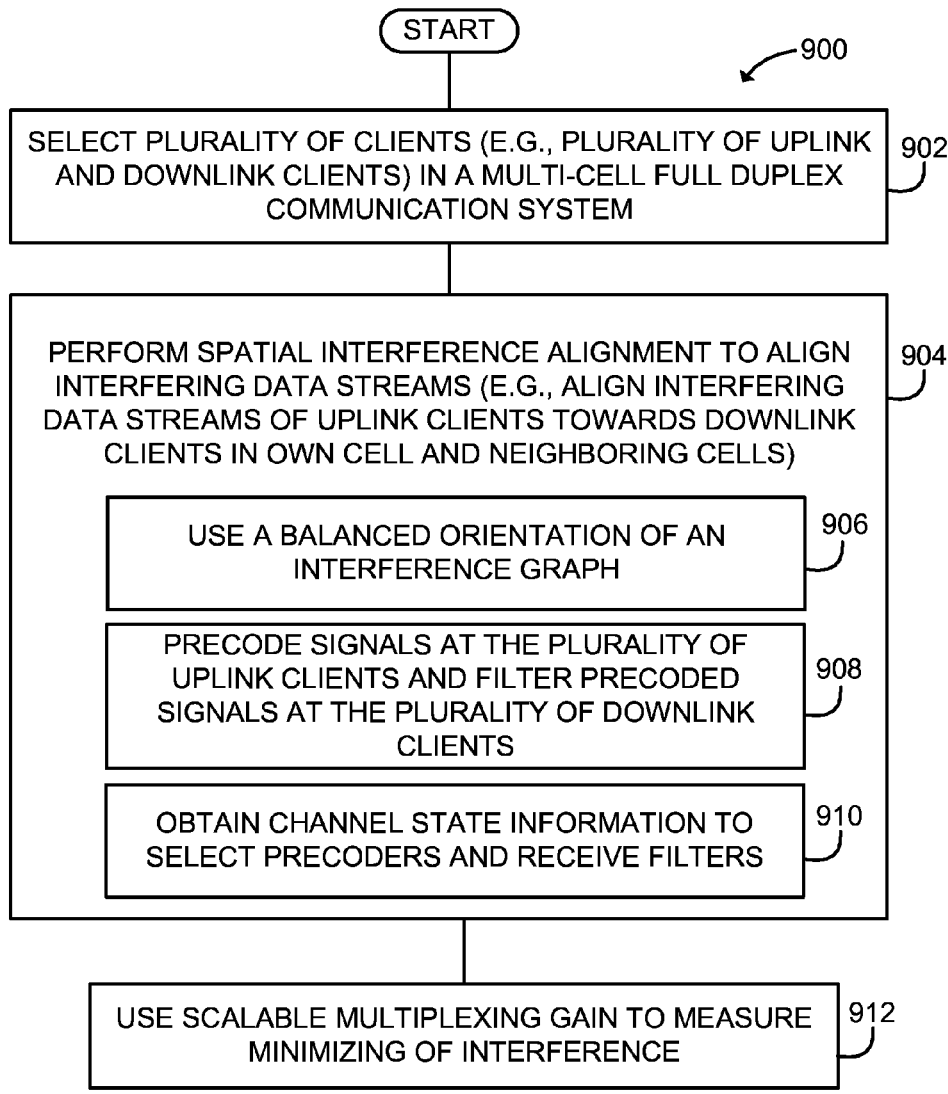
FIG. 9 is a block diagram illustratively depicting an exemplary method for minimizing intra-cell and inter-cell interference in a multi-cell full duplex communication system in a wireless network to provide a scalable multiplexing gain, in accordance with an embodiment of the present principles.

Referring to FIG. 9, a method for minimizing intra-cell and inter-cell interference 900 in a multi-cell full duplex communication system in a wireless network is illustratively depicted according to one embodiment of the present principles. The method 900 can be performed, for example, by any of system 1200 of FIG. 12 and/or system 1300 of FIG. 13.

In one embodiment, a plurality of clients may be selected in step 902. The plurality of clients may include a plurality of uplink clients and a plurality of downlink clients. The plurality of uplink clients may be configured to transmit signals and the plurality of downlink clients may be configured to receive signals over a plurality of data streams in each cell of a multi-cell full duplex communication system.

In step 904, spatial interference alignment may be performed on any data streams that interfere (e.g., interfering data streams) to align the interfering data streams of uplink clients towards downlink clients in its own cell (e.g., to minimize intra-cell interference) and downlink clients in a neighboring cell (e.g., to minimize inter-cell interference). In an embodiment, step 904 may include one or more of steps 906, 908, or 910 described in further detail below.

Figure 10:
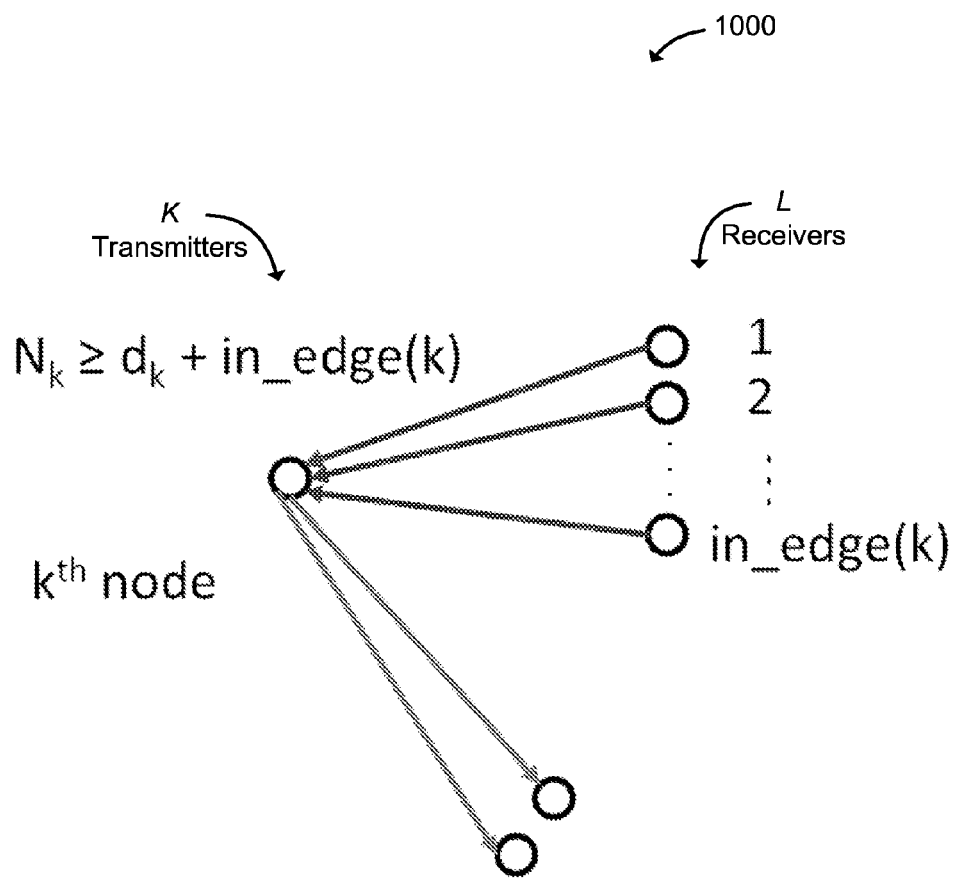
FIG. 10 is a schematic of a interference graph to address uplink-downlink interference (UDI) of a full duplex (FD) interference channel (FDIC) with a balanced orientation, in accordance with an embodiment of the present principles.

In one embodiment, spatial interference alignment may be performed by using a balanced orientation of an interference graph, as shown in step 906. For example, a balanced orientation of an interference graph may be used when the degree of freedom of each k node (e.g., client device) is one, wherein each k node is representative of either a transmitter node (TX) or a receiver node (RX). Referring now to FIG. 10, an example of balanced orientation of an interference graph 1000 in accordance with the present principles is illustratively depicted. In this example, K=MN downlink nodes and $$L = \left\lfloor \frac{MN^2}{MN - N + 1} \right\rfloor$$

uplink nodes, with each node sending or receiving a single stream (d=1), wherein each transmitter and each receiver is a node and there are N antennas at each node. In this embodiment, for example, the edges of the interference graph (e.g., in a FDIC) connecting K transmitters on left may be oriented to the L receivers on right in a balanced way. An orientation on the edges of the interference graph connecting k nodes on left to nodes on right is called balanced, if at each k node, the sum of dimensions incident on it (from the orientation) plus the dimensions of that node is at most N, as shown in FIG. 10. In FIG. 10, in_edge(k) represents some other k node. For an FDIC, where the DoF for each node is equal to d, such a balanced orientation can be shown to exist if N is a multiple of d and $d(L+K)(N-d)-d^2LK \geq 0$. Thus, the existence of a balanced orientation of edges is a sufficient condition for feasibility of spatial interference alignment.

Figure 11:
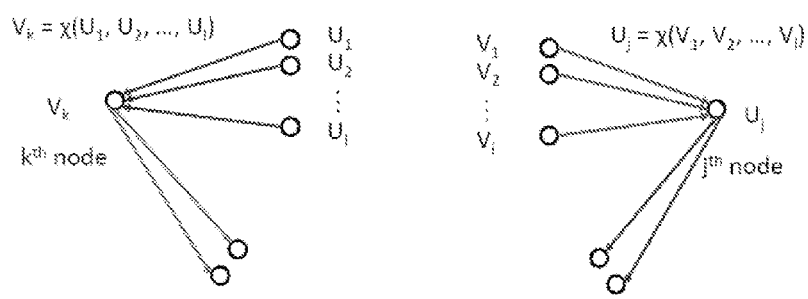
FIG. 11 is a schematic of a spatial interface alignment (IA) construction to address uplink-downlink interference (UDI), in accordance with an embodiment of the present principles.

Now referring to FIG. 11, using the balanced way of orienting the edges, $U_j$ can be found, which is orthogonal to $V_{i_1} H_{i_1 j}, \ldots, V_{i_k} H_{i_k j}$, at each receiver node j (with receiver vector $U_j$), by looking at edges which are oriented from some $V_{i_1}, \ldots, V_{i_k}$ to $U_j$, in accordance with one embodiment. This may be repeated for all receiver nodes. Accordingly, the edges going from the transmitters (UL) to the receivers (DL)

may be eliminated. Similarly, this may be repeated for the edges going from the receivers (DL) to the transmitters (UL), as illustrated in FIG. 11. Therefore, all equations given by the edges may be eliminated to obtain a final set of equations, only in terms of $V_i$'s. These final set of equations express each $V_i$ in the transmitter side in terms of some other $V_i$'s. These final equations may be solved to find $V_i$'s and subsequently find $U_i$'s.

With reference to FIG. 9, spatial interference alignment may be performed by precoding signals at the plurality of uplink clients using precoders to provide precoded signals and filtering the precoded signals at the plurality of downlink clients using receive filters in step 908. In step 910, performing spatial interference alignment may include obtaining and receiving channel state information (CSI) between the plurality of uplink clients and the plurality of downlink clients to appropriately select the precoders and the receive filters. As discussed earlier, channel state information (CSI) refers to known channel properties of a communication link, including how a signal propagates from a transmitter to a receiver.

In step 912, a scalable multiplexing gain may be used to measure the minimizing interference to which the present principles are applied. In one embodiment, the scalable multiplexing gain may be expressed using a closed form expression. In the following paragraphs, some examples of bounds on the multiplexing gain for interference alignment in FDIC type channels is provided. For example, for the purpose of finding the multiplexing gain, the FDIC may be parameterized by the number of antennas at each node N, the total number of transmitters from all M cells, say L, the total number of receivers, say K, and the per node DoF $d_i^T$ and $d_j^R$ at all transmitters and receivers, respectively. This FDIC may be referred to as (K, L) FDIC. It is noted that in FDIC, all transmitters (or receivers) in different cells may be treated the same since each and every one of them generate (or receive) interference at any receiving node (e.g., from any transmitting node).

In one embodiment, a symmetric FDIC may be employed, where, for example, the total number of receivers K is equal to the total number of transmitters L (e.g., K=L). Accordingly, the maximum number of streams at the uplink and downlink may be limited to 4N at the limit of large K. Under these circumstances, using a symmetric FDIC, the multiplexing gain offered by FD over HD cannot scale with M for M beyond 2. In view of the above, the maximum of the total DoF in a (K, K) FDIC channel with a symmetric d degree of freedom and N antennas at each node is $$2K \left\lfloor \frac{2N}{K+2} \right\rfloor.$$

This conclusion may be referred to as Lemma 1. In this example, the number of variables must be greater or equal to the number of constraint in order to have a feasible solution. With $d_i^T = d_j^R = d$ $\forall i$, Equation 3 may provide the following:

$$\sum_{i=1}^{K} d(N-d) + d(N-d) \geq \sum_{i=1}^{K}\sum_{j=1}^{K} d^2 \quad (4)$$

$$2Kd(N-d) \geq K^2 d^2 \quad (5)$$

-continued $$d \leq \frac{2N}{K+2} \quad (6)$$

Thus, 2K nodes each with DoF less than or equal to 2N+2 adds up to $$\frac{2N}{K+2}.$$

Accordingly, if the transmitting and receiving nodes between the M cells are divided, the multiplexing gain of FD over HD for large enough K=L would result in:

$$G \leq \frac{4}{MN} = \frac{4}{M} \quad (7)$$

which means that for M>2, the use of symmetric FDIC may limit the multiplexing gain of FD over HD.

In one embodiment, an asymmetric FDIC may be employed. While the number of degrees of freedom (DoF) may be made asymmetric and large in one direction (UL/DL) compared to the other, it must be noted that the maximum DoF that may be used by a combination of M cells is not more than MN in uplink or downlink. The following example indicates that the sum of DoF may not be limited if asymmetric FDIC is employed. The unlimited DoF in asymmetric FDIC arises from the fact that only in one direction, e.g., the receivers or the transmitters, the sum of DoF may grow arbitrarily large by adding more nodes. However, it is noted that the maximum DoF that may be used by combination of M access points in M cell may not be more than MN in uplink or downlink. Hence, asymmetric FDIC may provide bounded performance.

In view of the above, it has been determined that maximum degrees of freedom (DoF) in an arbitrarily large FDIC with maximum of N antennas at each node may not be limited by 4N and may be made arbitrarily large. This conclusion may be referred to as Lemma 2. For example, considering a (K, K) FBIC where the case that total uplink degrees of freedom is limited to N−1 results in the following:

$$\sum_{i=1}^{K} d_{t,i} \leq N - 1 \quad (8)$$

Accordingly, each node in the downlink may have at least one degree of freedom left. Hence the total number of degrees of freedom in the system can be made at least as large as N−1+K. Therefore, by increasing the number of downlink users, e.g., increasing K, the total degrees of freedom in the system can grow unboundedly and independent of the number antennas N. It is noted that the total number of uplink user does not need to increase with increasing K, and at most N−1 uplink user suffices to reach the desired result.

It is further noted that Lemma 2 reveals that the (K, K) FDIC with constant gain has degrees of freedom scaling that is much better than interference channel even with time extension (time varying channel with channel state information (CSI) at the transmitters) that is bounded by K/2.

While Lemma 2 states the existence of arbitrary scaling with respect to N in terms of total degrees of freedom, this scaling cannot be simultaneously achieved in the downlink and uplink. Therefore, the scaling gain of multi-cell full-duplex systems versus half duplex systems is limited and cannot reach the upper bound of 2.

In view of the above, considering FDIC with N antenna per node, if either of the uplink or downlink DoF scales with the number of antennas N as $(1+\alpha)N$ then the other one cannot scale with a scaling factor more than $$\left(1+\frac{1}{\alpha}\right),$$

where $\alpha$ is a non-negative real number. This provides that both uplink and downlink DoF cannot be made equal to 2N or larger simultaneously. This conclusion may be referred to as Lemma 3.

In on embodiment, scaling in the uplink and downlink may be bounded by $(1+\alpha)N$ and $(1+\beta)N$, where $\beta$ is a non-negative real number represented by $$\beta < \frac{1}{\alpha}.$$

In view of the above, the scaling factor of the multiplexing gain for FD over HD, $$G_{\frac{FD}{HD}},$$

may be determined in terms of the number of cells M by finding the value of $\alpha$ and $\beta$ which may maximize the multiplexing gain. Accordingly, in one embodiment, the multiplexing gain of FD over HD in a M cell full duplex system with a maximum of N antennas per node may not have a scaling better than $$\frac{1}{M-1}$$

with respect to the number of cells M. This conclusion may be referred to as Lemma 4. This result not only provides a lower bound on the scaling, but also clarifies that the upper bound is tight in terms of the scaling of the multiplexing gain of FD versus HD as a function of M.

It should be noted that a simple scheme that employs MN nodes (clients) in one direction and N−1 nodes in the other direction can achieve a scaling of $$\frac{1}{M}.$$

In one embodiment, a total DoF equal to N(M+1)−1 in a M cell full duplex system with maximum of N antennas per node and access point is achievable. This corresponds to the gain of $$1+\frac{N-1}{N}\frac{1}{M}$$

for using full duplex versus half duplex access points. This conclusion may be referred to as Lemma 5.

In the embodiments discussed above, it may be assumed that APs can perform cooperative MIMO or multi-point transmissions (called coordinated multi-point transmission, CoMP) in both the DL and UL. However, in practice it is much harder to achieve uplink CoMP than downlink CoMP, as the processing overhead and backhaul bandwidth for joint reception and decoding (at symbol level) of UL signals can be overwhelming compared to DL.

In one embodiment, a load factor parameter between uplink (UL) clients and downlink (DL) clients may be used. The load factor corresponds to the approximate ratio of traffic and/or throughput load between the downlink (e.g., base station to clients) and uplink (e.g., clients to base station) directions of traffic. In one embodiment, the scalable multiplexing gain may be dependent on a relative load factor parameter when only downlink coordinated multi-point transmission (CoMP) is available. When uplink CoMP is not possible, the maximum number of uplink streams in all cooperating cells may be limited by the number of antennas (at a node) and may not be more than N in HD. The multiplexing gain on the downlink is still MN due to downlink CoMP in HD. In the absence of uplink CoMP, the same construction for FD can be used, namely MN streams on the DL and $$\left(\frac{M}{M-1}\right)N$$

streams on the UL (for large N) simultaneously with both DL and UL CoMP, but the UL streams are restricted to N so that UL CoMP will not be required. In the absence of UL CoMP, the scaling of FD over HD, without UL CoMP, as a function of the relative load factor $\alpha$ may be expressed as:

$$G_{\frac{FD}{HD}}(\alpha)=\frac{(1-\alpha)+\min(M,\eta)}{(1-\alpha)(1+\eta)},$$

where $\eta$ is the relative fraction of DL to UL traffic, and $$\eta=\frac{\alpha M}{1-\alpha}.$$

In one embodiment, the scaling gain is maximum for FD when the DL and UL traffic are balanced, e.g., $$\alpha=\frac{1}{2}.$$

Accordingly, the best scaling gain may be represented as $$G_{\frac{FD}{HD}}=\frac{2M+1}{M+1}\to 2$$

(for large M). Thus, FD's multiplexing gain of 2 can be realized even for a large cluster of cells (with only DL CoMP). The larger gain in the case without UL CoMP arises not because FD's performance increases, but instead the loss in performance (due to absence of UL CoMP) is much more for HD (going from MN to N streams in UL) than for FD (going from $$\frac{MN}{M-1}$$

to N streams in UL).

Figure 12:
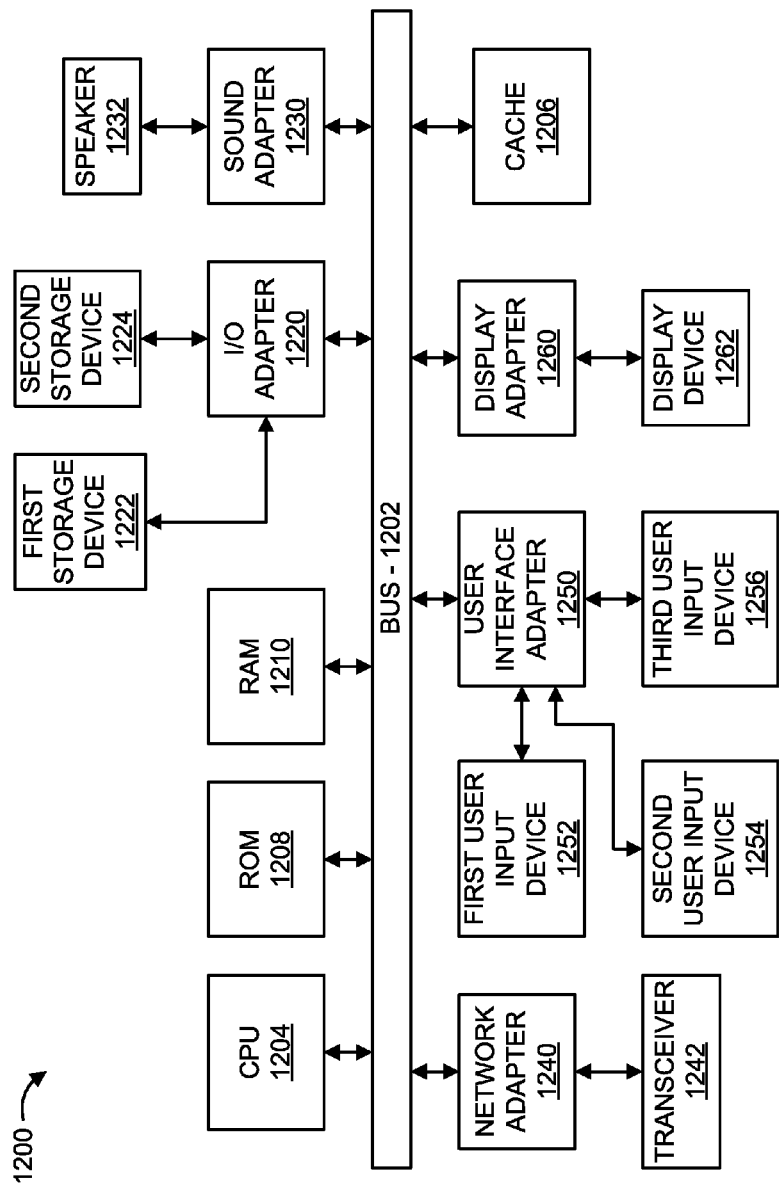
FIG. 12 shows an exemplary processing system to which the present principles may be applied, in accordance with an embodiment of the present principles.

Referring now to FIG. 12 with continued reference to FIG. 9, in another embodiment according to the present principles, an exemplary processing system 1200 to which the present principles may be applied, is illustratively depicted in accordance with one embodiment of the present principles. The processing system 1200 includes at least one processor ("CPU") 1204 operatively coupled to other components via a system bus 802. A cache 1206, a Read Only Memory ("ROM") 1208, a Random Access Memory ("RAM") 1210, an input/output ("I/O") adapter 1220, a sound adapter 1230, a network adapter 1240, a user interface adapter 1250, and a display adapter 1260, are operatively coupled to the system bus 1202.

A storage device 1222 and a second storage device 1224 are operatively coupled to system bus 1202 by the I/O adapter 1220. The storage devices 1222 and 1224 can be any of a disk storage device (e.g., a magnetic or optical disk storage device), a solid state magnetic device, and so forth. The storage devices 1222 and 1224 can be the same type of storage device or different types of storage devices.

A speaker 1232 is operatively coupled to system bus 1202 by the sound adapter 1230. A transceiver 1242 is operatively coupled to system bus 1202 by network adapter 1240. A display device 1262 is operatively coupled to system bus 1202 by display adapter 1260.

A first user input device 1252, a second user input device 1254, and a third user input device 1256 are operatively coupled to system bus 1202 by user interface adapter 850. The user input devices 1252, 1254, and 1256 can be any of a keyboard, a mouse, a keypad, an image capture device, a motion sensing device, a microphone, a device incorporating the functionality of at least two of the preceding devices, and so forth. Of course, other types of input devices can also be used. The user input devices 1252, 1254, and 1256 can be the same type of user input device or different types of user input devices. The user input devices 1252, 1254, and 1256 are used to input and output information to and from system 1200.

Of course, the processing system 1200 may also include other elements (not shown), as readily contemplated by one of skill in the art, as well as omit certain elements. For example, various other input devices and/or output devices can be included in processing system 1200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1200 are readily contemplated by one of ordinary skill in the art given the teachings of the present principles provided herein.

Figure 13:
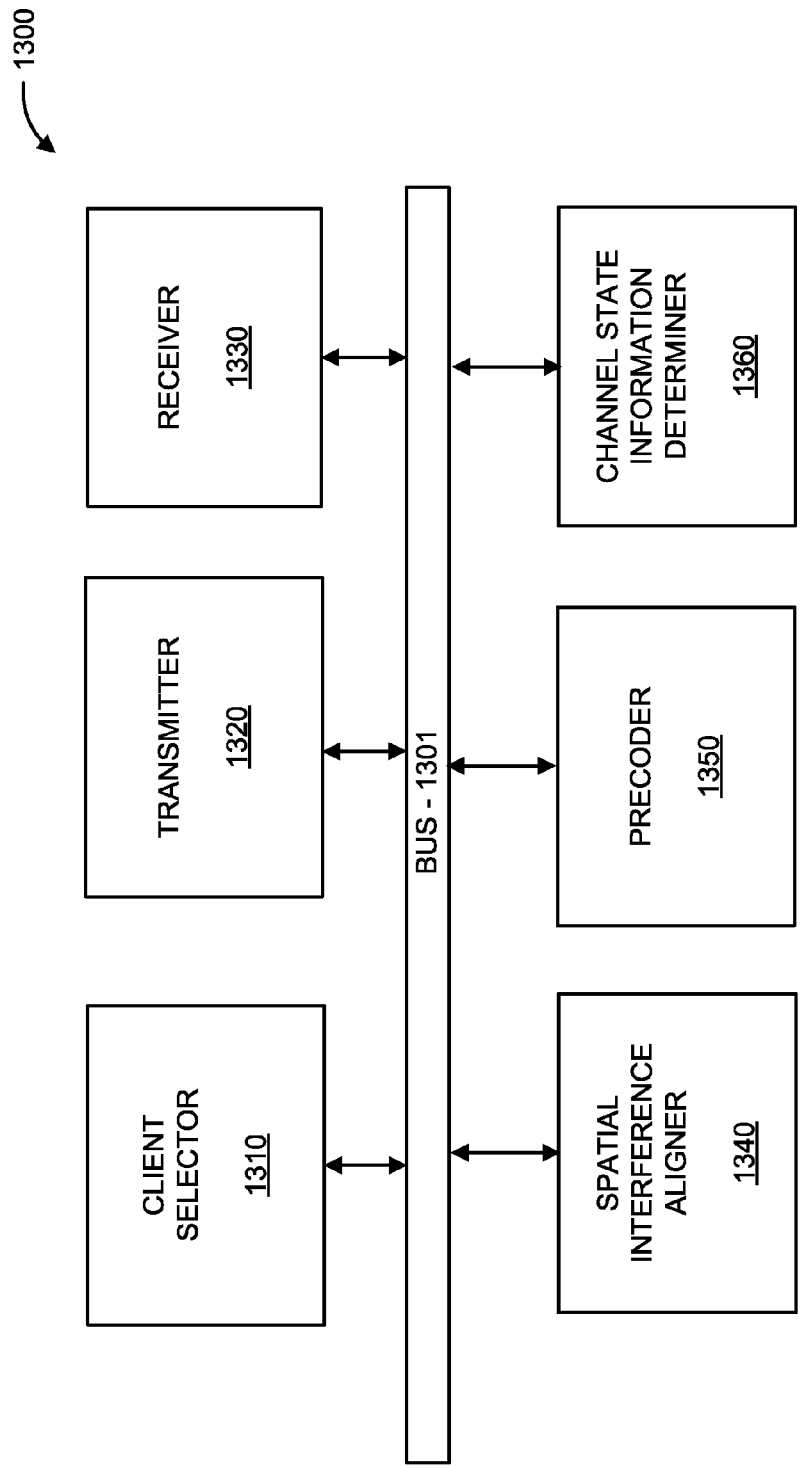
FIG. 13 shows an exemplary system for minimizing intra-cell and inter-cell interference in a multi-cell full duplex communication system in a wireless network to provide a scalable multiplexing gain, in accordance with an embodiment of the present principles.

Moreover, it is to be appreciated that system 1300 described below with respect to FIG. 13 is a system for implementing respective embodiments of the present principles. Part or all of processing system 1200 may be implemented in one or more of the elements of system 1300.

Further, it is to be appreciated that processing system 1200 may perform at least part of the method described herein including, for example, at least part of method 900 of FIG. 9. Similarly, part or all of system 1300 may be used to perform at least part of method 900 of FIG. 9.

FIG. 13 shows an exemplary system 1300 for an interference alignment system for minimizing intra-cell and inter-cell interference in a multi-cell full duplex communication system in a wireless network to provide a scalable multiplexing gain, in accordance with one embodiment of the present principles. While many aspects of system 1300 are described in singular form for the sake of illustration and clarity, the same can be applied to multiple ones of the items mentioned with respect to the description of system 1300. The system 1300 may include a client selector 1310, a transmitter 1320, a receiver 1330, a spatial interference aligner 940, a precoder 1350, and a channel state information determiner 1360.

The client selector 1310 may be configured to select a plurality of clients. The plurality of clients may include a plurality of uplink clients and a plurality of downlink clients. The plurality of uplink clients may be configured to transmit signals and the plurality of downlink clients may be configured to receive signals over a plurality of data streams in each cell of a multi-cell full duplex communication system.

The transmitter 1320 may be configured transmit signals from the plurality of uplink clients to the plurality of downlink clients (or receivers) via N antennas. In one embodiment, the transmitter 1320 may transmit interfering signals from the plurality of uplink clients to the plurality of downlink clients via N antennas.

The receiver 1330 may be configured to receive signals at the plurality of downlink clients from the plurality of uplink clients via N antennas. In one embodiment, the receiver 1330 may be configured to receive interfering signals from the plurality of downlink clients via N antennas.

The spatial interference aligner 1340 may be configured to perform spatial interference alignment on any data streams that interfere (e.g., interfering data streams) to align the interfering data streams of uplink clients towards downlink clients in its own cell and downlink clients in a neighboring cell. In one embodiment, spatial interference aligner 940 may be configured to perform spatial interference alignment by using a balanced orientation of an interference graph. In an embodiment, spatial interference aligner 1340 may be configured receive channel state information (CSI) from the channel state information determiner 1360 to appropriately select the precoders and the receive filters.

The precoder 1350 may be configured to precode signals at the plurality of uplink clients using precoders to provide precoded signals. The precoder 1350 may be further configured to filter the precoded signals at the plurality of downlink clients using receive filters. The channel state information determiner 1360 may be configured to obtain channel state information (CSI) between the plurality of uplink clients and the plurality of downlink clients to appropriately select the precoders and the receive filters. For example, the channel state information determiner 1360 may be configured to evaluate, estimate and/or measure channel properties of a communication link. In one embodiment, the channel state information determiner 1360 may be configured to obtain channel properties, including known channel properties, of a communication link and can determine channel state information based on such properties.

Further details regarding the functionality of the client selector 1310, the transmitter 1320, the receiver 1330, the spatial interference aligner 1340, the precoder 1350, and the channel state information determiner 1360 has been provided above with reference to FIGS. 1-11. The system 1300 may receive input data and/or produce output data, including a scalable multiplexing gain, which in one embodiment may be displayed on a display device 1262 of FIG. 12. It should be noted that while the above configuration is illustratively depicted, it is contemplated that other sorts of configurations may also be employed according to the present principles. These and other variations between configurations are readily determined by one of ordinary skill in the art given the teachings of the present principles provided herein, while maintaining the present principles.

In the embodiment shown in FIG. 13, the elements thereof are interconnected by a bus 1301. However, in other embodiments, other types of connections can also be used. Moreover, in one embodiment, at least one of the elements of system 1300 is processor-based. Further, while one or more elements may be shown as separate elements, in other embodiments, these elements can be combined as one element. The converse is also applicable, where while one or more elements may be part of another element, in other embodiments, the one or more elements may be implemented as standalone elements. These and other variations of the elements of system 1300 are readily determined by one of ordinary skill in the art, given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information", and has the title "Scaling Wireless Full-duplex in Multi-Cell Networks". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method for minimizing intra-cell and inter-cell interference in a multi-cell full duplex communication system in a wireless network, comprising:
   selecting, by a client selector, a plurality of clients, wherein the plurality of clients includes a plurality of uplink clients configured to transmit signals and a plurality of downlink clients configured to receive signals over a plurality of data streams in each cell of the multi-cell full duplex communication system; and
   performing, by a spatial interference aligner, spatial interference alignment on interfering data streams to align the interfering data streams of uplink clients towards downlink clients in its own cell and downlink clients in a neighboring cell, wherein performing the spatial interference alignment includes determining degrees of freedom per communication node such that a receiving node receives data streams from the plurality of data streams less than or equal to degrees of freedom per the receiving node and a transmitting node transmits data streams from the plurality of data streams less than or equal to degrees of freedom per the transmitting node.

2. The method of claim 1, wherein a plurality of antennas are available at each of the plurality of clients.

3. The method of claim 1, wherein the multi-cell full duplex communication system includes a plurality of cooperating access points.

4. The method of claim 1, wherein performing the spatial interference alignment provides a scalable multiplexing gain, the scalable multiplexing gain being representative of a degree of freedom or spatial dimension for each client.

5. The method of claim 4, wherein performing spatial interference alignment includes using a balanced orientation of an interference graph such that a number of links incident on a node and a number of degrees of freedom per the node is less than or equal to a number of antennas at the node.

6. The method of claim 1, wherein performing spatial interference alignment comprises:
   precoding signals at the plurality of uplink clients using precoders to provide precoded signals; and
   filtering the precoded signals at the plurality of downlink clients using receive filters.

7. The method of claim 6, further comprising obtaining channel state information between the plurality of uplink clients and the plurality of downlink clients to appropriately select the precoders and the receive filters.

8. The method of claim 1, wherein the plurality of uplink clients and the plurality of downlink clients are half duplex clients.

9. The method of claim 1, wherein the intra-cell and inter-cell interference comprises uplink downlink interference.

10. The method of claim 1, wherein a load factor parameter between the plurality of uplink clients and the plurality of downlink clients is used, the load factor parameter corresponding to a ratio of traffic between the downlink clients and uplink clients.

11. An interference alignment system for minimizing intra-cell and inter-cell interference in a multi-cell full duplex communication system in a wireless network, comprising:
   a client selector configured to select a plurality of clients, wherein the plurality of clients includes a plurality of uplink clients configured to transmit signals and a plurality of downlink clients configured to receive signals over a plurality of data streams in each cell of the multi-cell full duplex communication system; and
   a spatial interference aligner configured to perform spatial interference alignment on interfering data streams, using a hardware processor, to align the interfering data streams of uplink clients towards downlink clients in its own cell and downlink clients in a neighboring cell, wherein the spatial interference alignment includes determining degrees of freedom per communication node such that a receiving node receives data streams from the plurality of data streams less than or equal to degrees of freedom per the receiving node and a transmitting node transmits data streams from the plurality of data streams less than or equal to degrees of freedom per the transmitting node.

12. The interference alignment system of claim 11, wherein the spatial interference aligner is configured to perform spatial interference alignment to provide a scalable multiplexing gain, the scalable multiplexing gain being representative of a degree of freedom or spatial dimension for each client.

13. The interference alignment system of claim 12, wherein the spatial interference aligner is configured to perform spatial interference alignment on interfering data streams using a balanced orientation of an interference graph such that a number of links incident on a node and a number of degrees of freedom per the node is less than or equal to a number of antennas at the node.

14. The interference alignment system of claim 11, further comprising a precoder configured to:
   precode signals at the plurality of uplink clients using precoders to provide precoded signals;
   filter the precoded signals at the plurality of downlink clients using receive filters; and
   receive channel state information from the channel state information determiner between the plurality of uplink clients and the plurality of downlink clients to appropriately select the precoders and the receive filters.

15. The interference alignment system of claim 14, further comprising a channel state information estimator configured to obtain channel state information between the plurality of uplink clients and the plurality of downlink clients.

16. The interference alignment system of claim 11, further comprising:
   a transmitter configured to transmit signals at the plurality of uplink clients to the plurality of downlink clients via a plurality of antennas; and
   a receiver configured to receive signals at the plurality of downlink clients via the plurality of antennas.

17. A computer program product comprising a non-transitory computer readable storage medium having computer readable program code embodied therein for a method for minimizing intra-cell and inter-cell interference in a multi-cell full duplex communication system in a wireless network, the method comprising:
   selecting, by a client selector, a plurality clients in each cell of the multi-cell full duplex communication system, wherein the plurality of clients includes a plurality of uplink clients configured to transmit signals and a plurality of downlink clients configured to receive signals over a plurality of data streams; and
   performing, by a spatial inference aligner, spatial interference alignment on interfering data streams to align the interfering data streams of uplink clients towards downlink clients in its own cell and downlink clients in a neighboring cell, wherein performing the spatial interference alignment includes determining degrees of freedom per communication node such that a receiving node receives data streams from the plurality of data streams less than or equal to degrees of freedom per the receiving node and a transmitting node transmits data streams from the plurality of data streams less than or equal to degrees of freedom per the transmitting node.

18. The method of claim 17, wherein performing the spatial interference alignment provides a scalable multiplexing gain, the scalable multiplexing gain being representative of a degree of freedom or spatial dimension for each client.

19. The computer program product of claim 17, wherein performing spatial interference alignment comprises:
   precoding signals at the plurality of uplink clients using precoders to provide precoded signals; and
   filtering the precoded signals at the plurality of downlink clients using receive filters.

20. The method of claim 19, further comprising obtaining channel state information between the plurality of uplink clients and the plurality of downlink clients to appropriately select the precoders and the receive filters.

* * * * *